United States Patent
Wickliffe (10) Patent No.: US 9,458,653 B2
(45) Date of Patent: Oct. 4, 2016

(54) CHECK LINK STRUCTURE

(71) Applicant: Nissan North America, Inc., Franklin, TN (US)

(72) Inventor: Zachary Wickliffe, Southfield, MI (US)

(73) Assignee: Nissan North America, Inc., Franklin, TN (US)

( * ) Notice: Subject to any disclaimer, the term of this patent is extended or adjusted under 35 U.S.C. 154(b) by 48 days.

(21) Appl. No.: 14/550,494

(22) Filed: Nov. 21, 2014

(65) Prior Publication Data

US 2016/0145922 A1    May 26, 2016

(51) Int. Cl.
| | |
|---|---|
| *E05D 11/06* | (2006.01) |
| *E05D 11/10* | (2006.01) |
| *E05D 3/14* | (2006.01) |
| *E05D 5/06* | (2006.01) |
| *B60J 5/04* | (2006.01) |

(52) U.S. Cl.
CPC .............. *E05D 11/1042* (2013.01); *B60J 5/04* (2013.01); *E05D 3/147* (2013.01); *E05D 5/062* (2013.01); *E05D 11/1007* (2013.01)

(58) Field of Classification Search
CPC .................. Y10T 16/54026; Y10T 16/54028; Y10T 16/54029; Y10T 16/5409; Y10T 16/54025; Y10T 16/540257; Y10T 16/551; Y10T 16/5513; Y10T 16/6295; E05D 3/125; E05D 3/127; E05D 3/145; E05D 3/147; E05D 5/062; E05D 11/1007; E05D 11/1071; E05D 11/105; E05D 11/1057; E05D 11/1042; E05D 11/06; E05C 17/045; E05C 17/12; E05C 17/16; E05C 17/18; E05C 17/203; E05C 17/206; E05C 17/24; E05C 17/025; E05C 17/04

See application file for complete search history.

(56) References Cited

U.S. PATENT DOCUMENTS

| | | | | |
|---|---|---|---|---|
| 2,992,451 | A * | 7/1961 | Schonitzer | E05D 11/082 16/327 |
| 2,992,452 | A * | 7/1961 | Schonitzer | E05D 11/087 16/309 |
| 3,643,289 | A | 2/1972 | Lohr | |
| 3,837,040 | A * | 9/1974 | Keller | E05C 17/203 16/333 |
| 3,969,789 | A * | 7/1976 | Wize | E05D 11/1042 16/297 |
| 4,332,056 | A * | 6/1982 | Griffin | E05D 11/1071 16/341 |
| 4,672,715 | A | 6/1987 | Beckwith | |
| 5,018,243 | A * | 5/1991 | Anspaugh | E05D 11/1057 16/335 |
| 5,074,010 | A | 12/1991 | Gignac et al. | |

(Continued)

FOREIGN PATENT DOCUMENTS

| | | | | |
|---|---|---|---|---|
| DE | 2716220 | A1 * | 10/1978 | ......... E05D 11/1014 |
| DE | 3307084 | C1 * | 3/1984 | ......... E05D 11/1042 |

(Continued)

*Primary Examiner* — Chuck Mah
(74) *Attorney, Agent, or Firm* — Global IP Counselors, LLP (57) ABSTRACT

A check link structure includes a first bracket, a cam arm and a cam follower. The first bracket has a pivot support structure defining a first pivot axis. The cam arm is coupled to the first bracket for pivotal movement about the first pivot axis. The cam arm includes a cam block and a support shell. The cam block has a cam surface that includes a plurality of positioning recesses and a plurality of movement restricting lobes between adjacent ones of the plurality of positioning recesses. The support shell defines a block receiving space that non-movably retains the cam block. The cam follower has a follower surface that is configured to continuously contact the cam surface of the cam block in response to movement of one of the first bracket and the cam follower relative to the other of the first bracket and the cam follower.

19 Claims, 6 Drawing Sheets

(56) References Cited

U.S. PATENT DOCUMENTS

| | | | |
|---|---|---|---|
| 5,218,738 A | 6/1993 | Krajenke | |
| 5,323,512 A | 6/1994 | Little | |
| 5,570,498 A * | 11/1996 | Hipkiss | E05D 7/1044 16/258 |
| 5,926,917 A * | 7/1999 | Gantz | E05D 11/1071 16/286 |
| 6,038,738 A | 3/2000 | Neag et al. | |
| 6,073,308 A * | 6/2000 | Linnenbrink | E05D 11/1071 16/263 |
| 6,332,243 B1 | 12/2001 | Kim | |
| 6,568,741 B1 * | 5/2003 | Leung | E05D 5/062 16/334 |
| 6,901,634 B2 * | 6/2005 | Shaw | E05C 17/203 16/344 |
| 6,938,303 B2 | 9/2005 | Watson et al. | |
| 7,437,802 B2 | 10/2008 | Ochiai | |
| 7,506,406 B2 | 3/2009 | Murayama et al. | |
| 7,596,831 B2 | 10/2009 | Faubert et al. | |
| 7,610,657 B2 | 11/2009 | Doswell et al. | |
| 7,913,354 B2 | 3/2011 | Tashima et al. | |
| 8,651,556 B2 | 2/2014 | Cutting | |
| 2002/0023313 A1 * | 2/2002 | Parizel | E05D 11/1071 16/318 |
| 2002/0069481 A1 | 6/2002 | Ashline et al. | |
| 2003/0093873 A1 * | 5/2003 | Linnenbrink | E05D 11/081 16/85 |
| 2004/0020014 A1 * | 2/2004 | Linnenbrink | E05D 11/1071 16/344 |
| 2007/0234520 A1 * | 10/2007 | Faubert | E05D 3/18 16/357 |
| 2010/0018004 A1 * | 1/2010 | Ochiai | E05D 5/062 16/250 |
| 2013/0042435 A1 * | 2/2013 | Schott | E05D 5/062 16/321 |

FOREIGN PATENT DOCUMENTS

| | | | | |
|---|---|---|---|---|
| DE | 4024370 A1 | * | 2/1992 | ......... E05D 11/1085 |
| DE | 29500528 U1 | * | 6/1996 | ........... E05C 17/203 |
| DE | 29914042 U1 | * | 12/1999 | ........... E05C 17/025 |
| DE | 102004036166 B3 | * | 1/2006 | ......... E05D 11/1085 |
| DE | 102009057214 A1 | * | 5/2011 | ............. E05C 17/38 |
| FR | 2705389 A1 | * | 11/1994 | ........... E05D 11/082 |
| FR | EP 0691448 A1 | * | 1/1996 | ......... E05D 11/1057 |
| FR | EP 0930412 A1 | * | 7/1999 | ......... E05D 11/1057 |
| FR | 2915504 A1 | | 10/2008 | |
| JP | 2001220939 A | * | 8/2001 | |
| JP | 2006-307430 A | | 11/2006 | |

* cited by examiner

FIG. 12

CHECK LINK STRUCTURE

BACKGROUND

1. Field of the Invention

The present invention generally relates to a check link structure. More specifically, the present invention relates to a hinge check link structure for a door that includes a cam block made of a self-lubricating material that is supported by a rigid support shell.

2. Background Information

Check links are used on vehicles to hold doors at the fully open position and at predetermined intermediate positions between the closed position and the fully open position. Typically, check links include at least one cam surface and a cam follower that presses against the cam surface and extends into a recess or recesses to hold the door at corresponding positions. The effort to move the door between the various positions is usually consistent relative to the cam recesses, and requires additional effort when the cam follower (or the cam surface) is moved such that the cam follower is positioned between the recesses.

Sprung cam style check links remain external to both the door and the body, and can be integral with the hinge structure. The sprung cam check link includes a cam arm pivotally mounted to a first bracket attached to one of the door or the body, and a cam follower fixed to a second bracket attached to the other of the door and the body. A spring is fixed to the first bracket and biases the cam arm into engagement with the cam follower. As the door moves relative to the body, the cam arm moves relative to the cam follower.

The cam arm of the sprung cam style check link is usually constructed of similar material to the hinge, and is usually painted with the hinge to match the body color. The continual contact between the cam arm against the cam follower can cause the paint to be removed from the cam arm. Since the cam arm is externally located, it can be exposed to the elements and begin rusting over time as the paint is removed. When the cam arm rusts, it makes noise as it rubs against the cam follower, and the performance of the check link can impedes the movement of the door, requiring repairs and/or addition of lubricant.

SUMMARY

One object of the disclosure is to provide a hinge structure with a check link structure that has no need for lubrication.

Another object of the disclosure is to provide a hinge structure with a check link structure that includes self-lubricating material.

In view of the state of the known technology, one aspect of the disclosure is a check link structure that includes a first bracket, a cam arm and a cam follower. The first bracket has a pivot support structure defining a first pivot axis. The cam arm is coupled to the first bracket for pivotal movement about the first pivot axis. The cam arm includes a cam block and a support shell. The cam block has a cam surface that includes a plurality of positioning recesses and a plurality of movement restricting lobes between adjacent ones of the plurality of positioning recesses. The support shell defines a block receiving space that non-movably retains the cam block. The cam follower has a follower surface that is configured to continuously contact the cam surface of the cam block in response to movement of one of the first bracket and the cam follower relative to the other of the first bracket and the cam follower.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
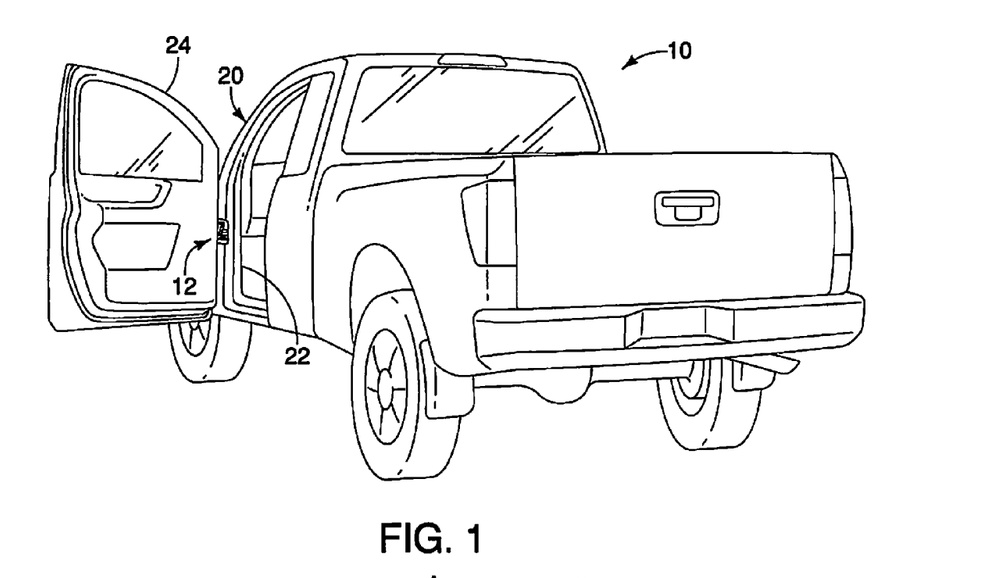
FIG. 1 is a perspective view of a vehicle with a door showing a hinge mechanism that supports the door to the vehicle in accordance with a first embodiment.
Figure 2:
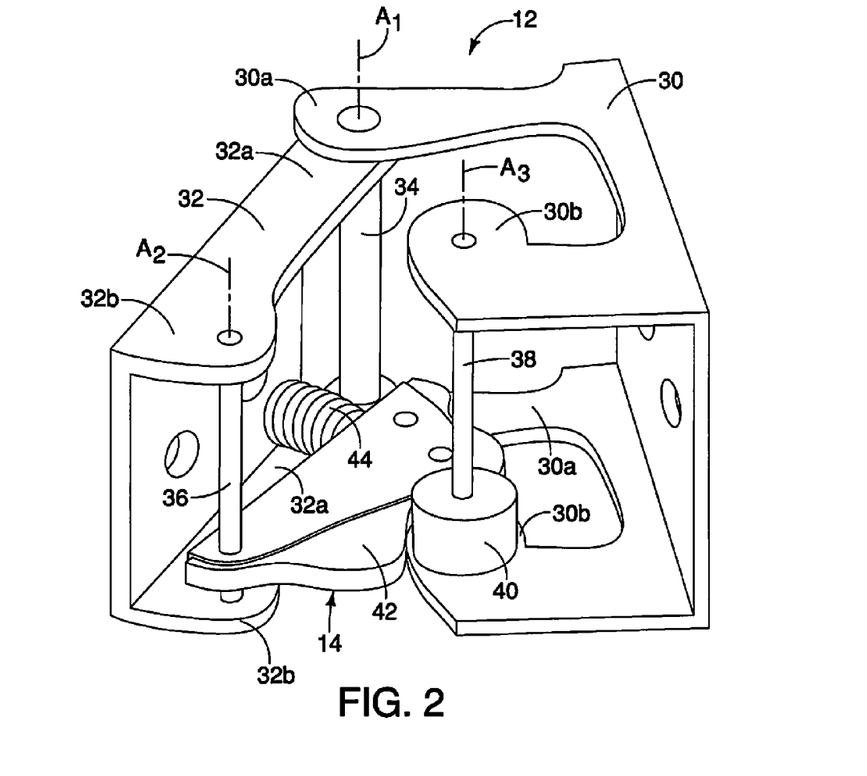
FIG. 2 is a perspective view of the hinge mechanism showing a check link structure, the check link structure including a cam arm with a support shell and a cam block supported within the support shell in accordance with the first embodiment.

Referring initially to FIG. 1, a vehicle 10 having a hinge mechanism 12 with a check link structure 14 (FIG. 2) is illustrated in accordance with a first embodiment.

The vehicle 10 also includes a body structure 20 that defines a door opening 22 (a closure panel opening). A door 24 (a closure panel) is pivotally supported on the body structure 20 by the hinge mechanism 12. The door 24 is a closure panel. It should be understood from the drawings and the description herein that the door 24 or closure panel can be any of a variety of structures that pivotally move between a closed position and an open position, such as a trunk lid, a rear lift gate or an engine covering hood.

Several hinge mechanisms can be employed to support the door 24 to the body structure 20. However, only one hinge mechanism 12 is shown and described herein for the sake of brevity. The door 24 is supported by the hinge mechanism 12 for movement between an open position shown in FIG. 1 and a closed position (not shown) in which the door opening 22 is covered.

Since body structures of vehicles and doors of vehicles are conventional vehicle features, further description is omitted for the sake of brevity.

The hinge mechanism 12 will now be described with specific reference to FIGS. 2-5. The hinge mechanism 12 includes a first bracket 30, a second bracket 32, a first pivot pin 34, a second pivot pin 36, a third pivot pin 38 and the check link structure 14. The first bracket 30 is configured to attach to one of the body structure 20 and the door 24. The second bracket 32 is configured to attach to the other of the body structure 20 and the door 24. In the depicted embodiment, the first bracket 30 attaches to the body structure 20 and the second bracket 32 attaches to the door 24. However, it should be understood from the drawings and the description herein that the first bracket 30 can alternatively be attached to the door 24 and the second bracket 32 can be attached to the body structure 20.

The first pivot pin 34 extends through flange portions 30a of the first bracket 30 and also extend through flange portions 32a of the second bracket 32 such that the first bracket 30 and the second bracket 32 can undergo pivotal movement with respect to one another about the first pivot pin 34. The first pivot pin 34 defines a first axis $A_1$. Hence, the first bracket 30 and the second bracket 32 pivot about the first axis $A_1$.

The second pivot pin 36 extends through flanges 32b of the second bracket 32 and define a second pivot axis $A_2$, described in greater detail below. The third pivot pin 38 extends through flanges 30b of the first bracket 30 and define a third pivot axis $A_3$, as is also described in greater detail below. The first, second and third pivot axis $A_1$, $A_2$ and $A_3$ are each pivot support structures that are spaced apart from one another and are all parallel to one another.

The check link structure 14 includes a cam follower 40 and a cam arm 42. The cam follower 40 is coupled to the first bracket 30. More specifically, the cam follower 40 is mounted to the third pivot pin 38 for rotating movement about the third axis $A_3$. Alternatively, the cam follower 40 can be fixedly or non-rotatably attached to the first bracket 30. The cam follower 40 is basically a roller that contacts the cam arm 42, as described in greater detail below.

A description of the cam arm 42 is now provided with specific reference to FIGS. 2-9. The cam arm 42 is coupled to the second bracket 32 for pivotal movement about the second pivot axis $A_2$. More specifically, the cam arm 42 pivots about the second pivot pin 36. The cam arm 42 is biased into contact with the cam follower 40 by a biasing member 44, as shown in FIGS. 2-5. In the depicted embodiment, the biasing member 44 is a coil spring. However, the biasing member 44 can be any spring structure that provides a biasing effect urging one member into contact with another member.

Figure 6:
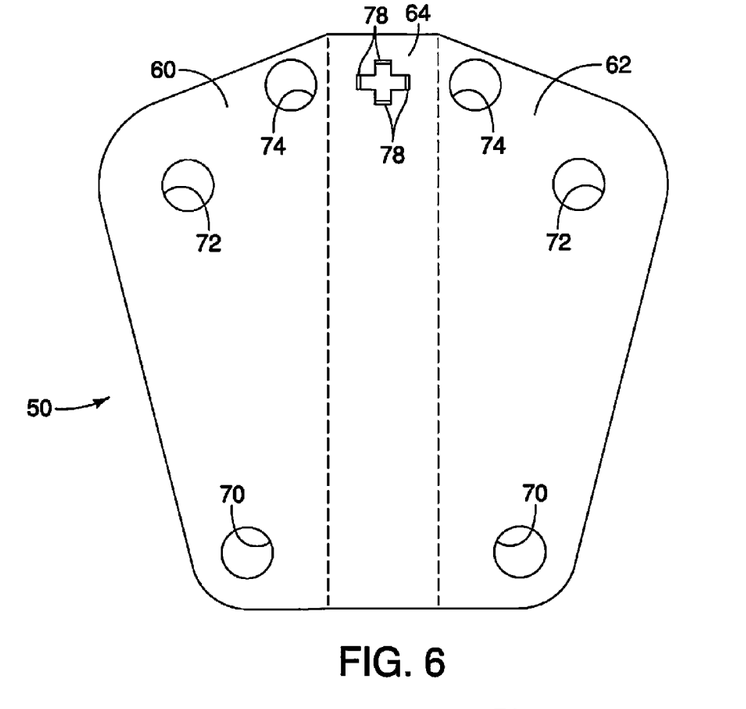
FIG. 6 is a plan view of a sheet metal material in a preliminary manufacturing step prior to being stamped or deformed into a final shape of the support shell of the cam arm in accordance with the first embodiment.
Figure 7:
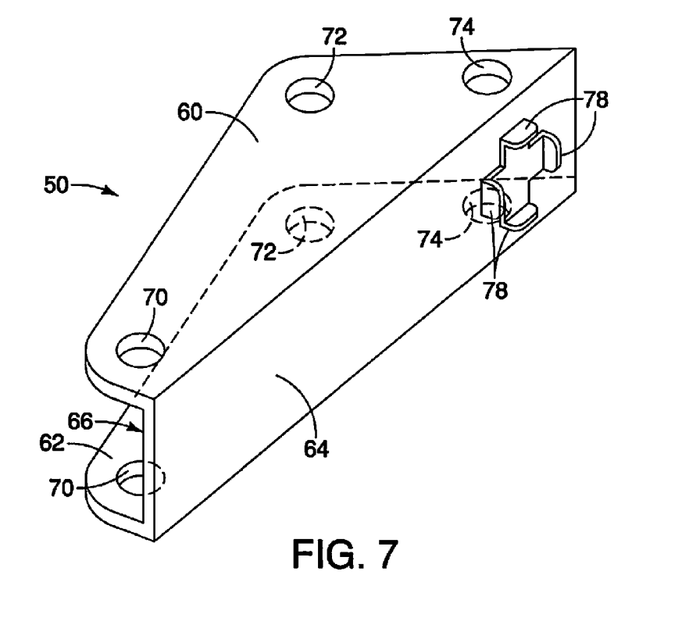
FIG. 7 is a perspective view of the support shell of the cam arm after being stamped or deformed into its final shape, but prior to insertion of the cam block in accordance with the first embodiment.

The cam arm 42 basically includes a support shell 50 and a cam block 52. As shown in FIGS. 6 and 7, the support shell 50 can be made from a flat metallic material that is molded, bent, stamped or otherwise deformed and shaped to define the U-shaped member hereinafter referred to as the support shell 50. The support shell 50 includes a first plate 60, a second plate 62 and a base plate 64 (a rear plate). In the depicted embodiment, the first plate 60, the second plate 62 and the base plate 64 are all formed from a single piece of flat metallic material, as indicated in FIGS. 6 and 7. Hence, the first plate 60, the second plate 62 and the base plate 64 are unitarily formed as a single, monolithic element having a U-shape when viewed from either end thereof.

The first plate 60 defines a first side of the support shell 50 and the second plate 62 defines a second side of the support shell 50. The first plate 60, the second plate 62 and the base plate 64 together define a block receiving space 66 (FIG. 7 only) that is configured to non-movably retain the cam block 52. The block receiving space 66 is defined between the first plate 60 and the second plate 62 and is further confined at one end thereof by the base plate 64.

The first plate 60 and the second plate 62 overall have identical dimensions and profiles (identically shaped). However, it should be understood from the drawings and the description herein that the first plate 60 and the second plate 62 can alternatively have differing overall shapes and dimensions. The first plate 60 and the second plate 62 each include axially aligned openings 70, 72 and 74. The openings 72 and 74 are dimensioned to receive fasteners $F_1$ that retain the cam block 52 within the block receiving space 66.

The base plate 64 (or rear plate) extends between the first plate 60 and the second plate 62, being rigidly formed therewith.

Figure 9:
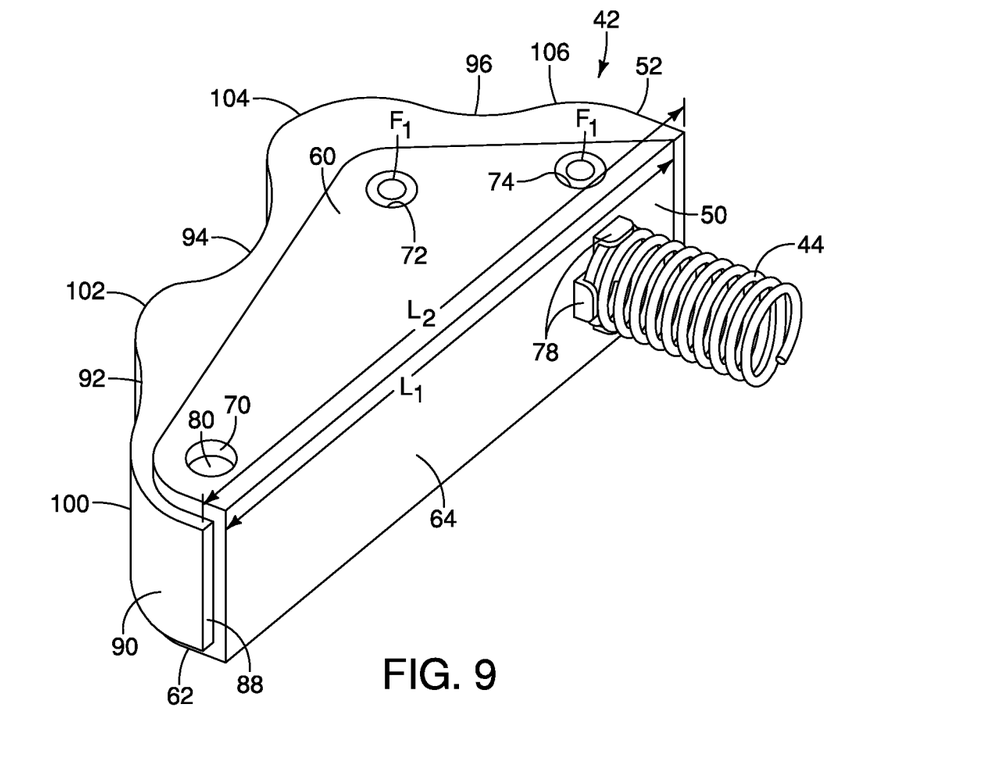
FIG. 9 is a perspective view of the cam arm with the cam block installed to the support shell in accordance with the first embodiment.

As shown in FIGS. 6, 7 and 9, the base plate 64 further includes a plurality of retention tabs 78. The retention tabs 78 extend from an outer surface of the base plate 64 (the rear plate) of the support shell 50. As shown in FIG. 9, one end of the biasing member 44 is retained to the support shell 50 by the retention tabs 78.

Figure 8:
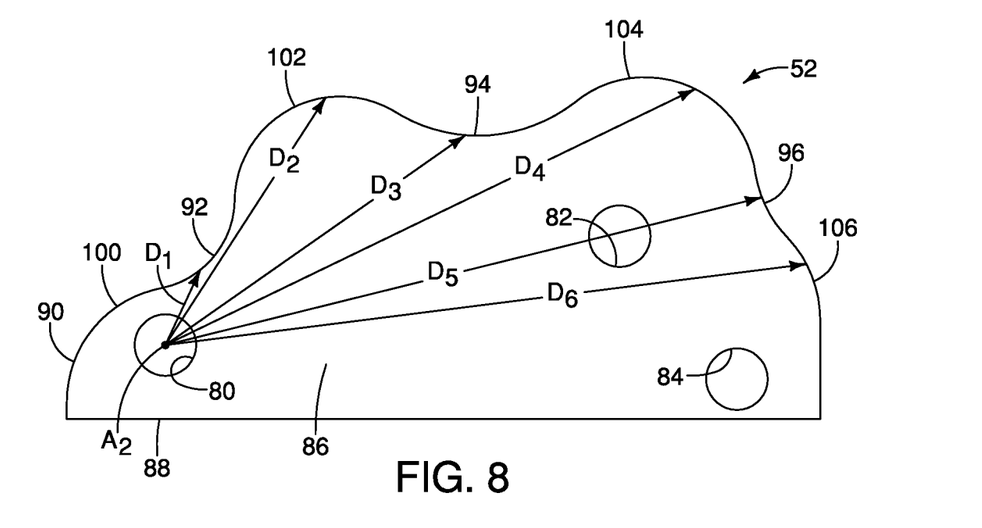
FIG. 8 is a top view of the cam block showing an edge view of a cam surface that includes a plurality of positioning recesses and a plurality of movement restricting lobes prior to installation into the support shell in accordance with the first embodiment.

The cam block 52 is now described with specific reference to FIGS. 8 and 9. The cam block 52 is made of a single, monolithic block of self-lubricating material, also referred to as a frictionless material. More specifically, the cam block 52 can be made of a single block of, for example, polytetrafluoroethylene (also known as PTFE and marketed as Teflon®), perfluoroalkoxy, fluorinated ethylene propylene (FEP) and/or materials sold under the name Nylatron®, or Delrin®. Other self-lubricating materials can additionally or alternatively be used to form the cam block 52.

The cam block 52 is dimensioned to fit snugly between the first plate 60 and the second plate 62 within the block receiving space 66 of the support shell 50. The cam block 52 includes three openings 80, 82 and 84 that extend completely through the cam block 52, from one side to the other side of the cam block 52. The openings 80, 82 and 84 are spaced apart from one another such that the opening 80 aligns with the openings 70 in the support shell 50, the opening 82 aligns with the openings 72 in the support shell 50, and the opening 84 aligns with the openings 74 in the support shell 50.

One of the fasteners $F_1$ is inserted through the openings 72 in the support shell 50 and further through the opening 82 in the cam block 52 securing the support shell 50 to the cam block 52. Further, another one of the fasteners $F_1$ is inserted through the openings 74 in the support shell 50 and further through the opening 84 in the cam block 52 further securing the support shell 50 to the cam block 52.

The openings 70 in the support shell 50 and the opening 80 in the cam block 52 are dimensioned and positioned to receive the second pivot pin 36 such that the cam block 52 can undergo limited pivotal movement with respect to the second bracket 32 of the hinge mechanism 12.

The cam block 52 is further formed with side surfaces 86 (only one side surface is visible in FIGS. 8 and 9), a base surface 88 and a cam surface 90. The cam surface 90 is a non-planar or contoured surface that curves and meanders from one end of the base surface 88 to the other end of the base surface 88 of the cam block 52. The cam surface 90 includes a plurality of positioning recesses 92, 94 and 96, and a plurality of movement restricting lobes 100, 102, 104 and 106 located between adjacent ones of the plurality of positioning recesses 92, 94 and 96. The plurality of positioning recesses 92, 94 and 96 and the plurality of movement restricting lobes 100, 102, 104 and 106 of the cam block 52 are completely exposed outside of the block receiving space 66 of the support shell 50. As shown in FIG. 8, the lobe 100 is adjacent to the opening 80 that partially defines the third pivot axis $A_3$. The recess 92 is a first distance $D_1$ away from the third pivot axis $A_3$. The lobe 102 is a second distance $D_2$ away from the third pivot axis $A_3$, the second distance $D_2$ being greater than the first distance $D_1$. The recess 94 is a third distance $D_3$ away from the third pivot axis $A_3$, the third distance $D_3$ being greater than the second distance $D_2$. The lobe 104 is a fourth distance $D_4$ away from the third pivot axis $A_3$, the fourth distance $D_4$ being greater than the third distance $D_3$. The recess 96 is a fifth distance $D_5$ away from the third pivot axis $A_3$, the fifth distance $D_5$ being greater than the fourth distance $D_4$. The lobe 106 is a sixth distance $D_6$ away from the third pivot axis $A_3$, the sixth distance $D_6$ being greater than the fifth distance $D_5$.

More specifically, the base plate 64 of the support shell 50 covers a majority of the base surface 88 of the cam block 52, with small portions of the base surface 88 projecting out of the block receiving space 66, as seen in FIGS. 9. More specifically, the base plate 64 of the support shell 50 has a first overall length $L_1$ and the base surface 88 of the cam block 52 has a second overall length $L_2$, as shown in FIG. 9. The second overall length $L_2$ of the cam block 52 is greater than the first overall length $L_1$ of the support shell 50. Each of the first and second plates 60 and 62 cover a majority (but not all) of respective side surfaces 86 of the cam block 52, as is also shown in FIG. 9. In other words, the cam surface 90 of the cam block 52 is spaced apart from edges of the first and second plates 60. Specifically, each of the plurality of positioning recesses 92, 94 and 96, and each of the plurality of movement restricting lobes 100, 102, 104 and 106 are located on portions of the cam block 52 that extend outward and away from the first and second plates 60 and 62 of the support shell 50.

As shown in FIGS. 2-5, the biasing member 44 urges or presses the cam arm 42 into continuous contact with the cam follower 40. More specifically, the cam surface 90 of the cam block 52 is urged into continuous contact with the cam follower 40. The biasing member 44 is confined at its first end by the retention tabs 78 on the base plate 64 of the supporting shell 50 of the cam arm 42. A second end of the biasing member 44 is retained by a retention projection (not shown) on the surface of the second bracket 32.

When the door 24 is opened and closed, the second bracket 32 of the hinge mechanism 12 pivots about the first axis $A_1$ and relative to the first bracket 30 of the hinge mechanism 12. With the door 24 in the closed position, the second bracket 32 is positioned relative to the first bracket 30 with the orientations represented schematically in FIG. 3. When the door 24 is opened and moved to an intermediate open orientation, the second bracket 32 moves to a position relative to the first bracket 30 with the orientations represented schematically in FIG. 4. When the door 24 is moved to a fully opened orientation, the second bracket 32 moves to a position relative to the first bracket 30 with the orientations represented schematically in FIG. 5.

Figure 3:
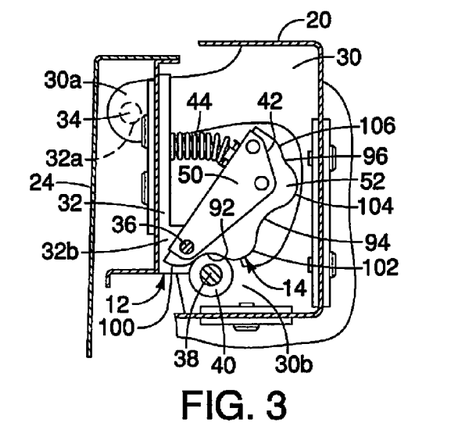
FIG. 3 is a top schematic view of the hinge mechanism showing the hinge mechanism and the check link structure in a door closed orientation in accordance with the first embodiment.
Figure 4:
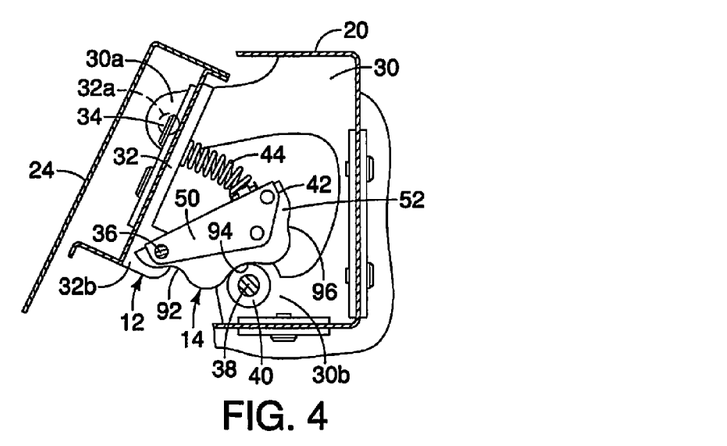
FIG. 4 is another top schematic view of the hinge mechanism similar to FIG. 3 showing the hinge mechanism and the check link structure in an intermediate open orientation in accordance with the first embodiment.
Figure 5:
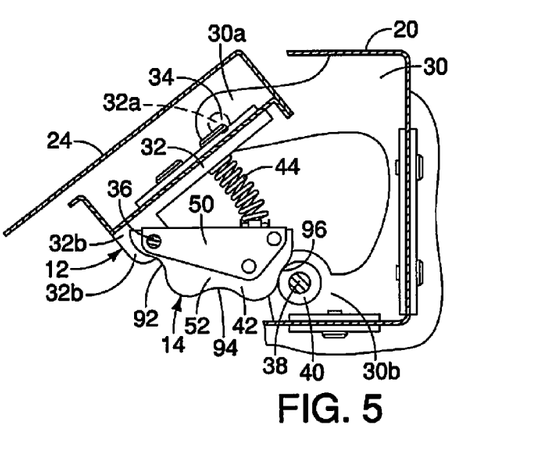
FIG. 5 is yet another top schematic view of the hinge mechanism similar to FIG. 3 showing the hinge mechanism and the check link structure in a fully open orientation in accordance with the first embodiment.

In the closed orientation shown in FIG. 3, the biasing spring 44 urges the cam arm 42 toward the cam follower 40 such that the cam follower 40 contacts the cam surface 90 at the positioning recess 92. With the movement restricting lobes 100 and 102 being located on either side of the positioning recess 92, the interaction between the cam follower 40 and the cam arm 42 assists in urging the door 24 to remain in the closed orientation.

As the door 24 and the second bracket 32 move to the intermediate open orientation (FIG. 4), the urging action of the biasing member 44 causes the cam arm 42 to press against the cam follower 40 such that the cam follower 40 first contacts the movement restricting lobe 102, then moves into contact with the positioning recess 94 of the cam surface 90. The interaction between the cam follower 40 and the positioning recess 94 of the cam surface 90 of the cam arm 42 assists in urging the door 24 to remain in the intermediate open orientation shown in FIG. 4.

As the door 24 and the second bracket 32 are moved to the fully open orientation (FIG. 5) from the intermediate open orientation (FIG. 4), the urging action of the biasing member 44 causes the cam arm 42 to press against the cam follower 40 such that the cam follower 40 first contacts the movement restricting lobe 104, then moves into contact with the positioning recess 96 of the cam surface 90. The interaction between the cam follower 40 and the positioning recess 96 of the cam surface 90 of the cam arm 42 assists in urging the door 24 to remain in the fully open orientation shown in FIG. 5.

It should be understood from the drawings and the description herein, that the cam follower 40 and the cam arm 42 can be reconfigured such that the cam arm 42 is rigidly fixed to one of the first bracket 30 and the second bracket 32, and the cam follower 40 can be pivotally supported to the other of the first bracket 30 and the second bracket 32 and be spring biased into contact with the cam arm 42.

It should also be understood from the drawings and the description herein, that the hinge mechanism 12 can include any of a variety of structures and configurations and is not limited to the configuration represented in the drawings. Moreover, the cam arm 42 and cam follower 40 of the check link structure 14 can be installed to any of a variety of hinge structures. More specifically, the check link structure 14 as described herein can be installed in any of a variety of hinge structures other than that described herein. Further, the check link structure 14 can be separate and spaced apart from the hinge mechanism 12 and need not be a part of the hinge mechanism 12. In other words, the door 24 can be supported by hinge mechanisms 12 that do not include the check link structure 14. In this configuration, the cam follower 40 is fixedly attached to one of the door 24 and the body structure 20 and the cam arm 42 is attached for pivoting movement (along with the biasing member 44) to the other of the door 24 and the body structure 20.

The check link structure 14 described herein includes the support shell 50 and the cam block 52 that is composed of a durable self-lubricating material. The support shell 50 provides rigid support to the cam block 52 with the support shell 50 covering at least a majority of three surface of the cam block 52. The cam block 52 includes the cam surface 90 that is located outside of the block receiving space 66 defined by the support shell 50.

Second Embodiment

Figure 10:
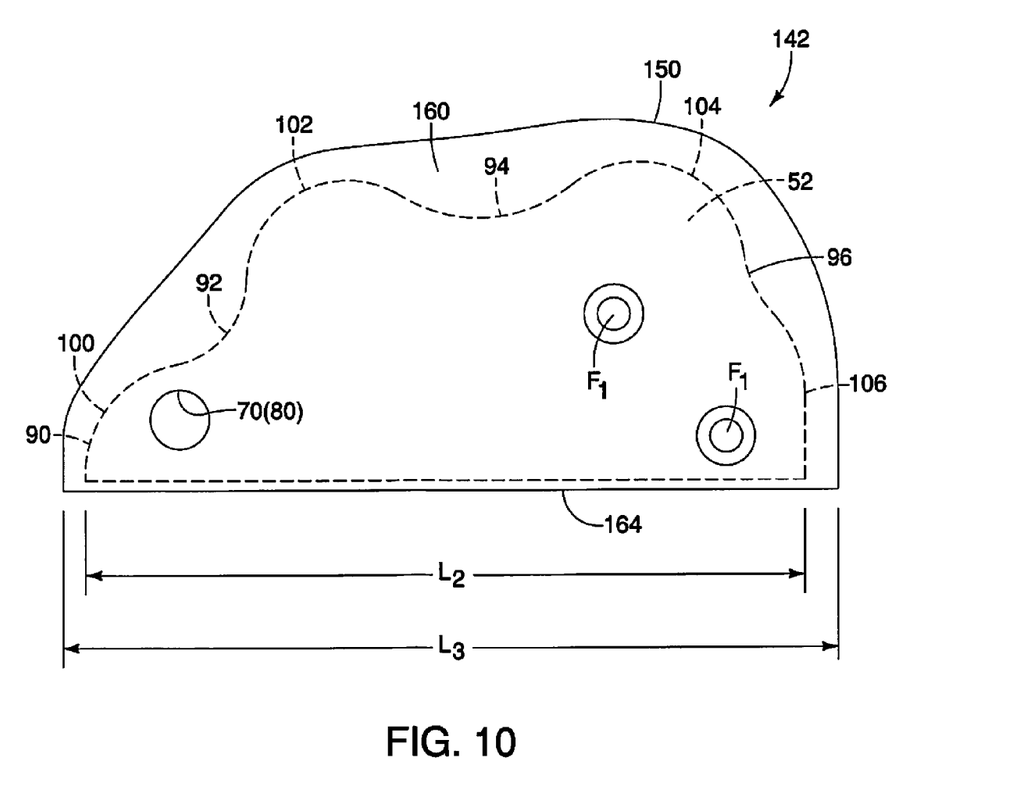
FIG. 10 is a top view of a cam arm of a check link structure showing a support shell and the cam block in accordance with a second embodiment.
Figure 11:
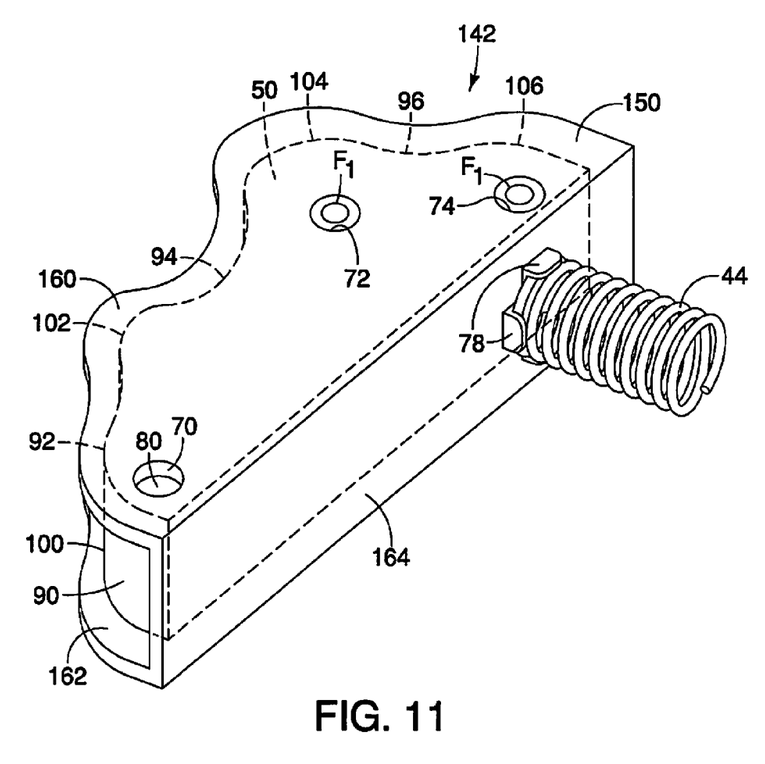
FIG. 11 is a perspective view of the cam arm with the cam block installed to the support shell in accordance with the second embodiment.
Figure 12:
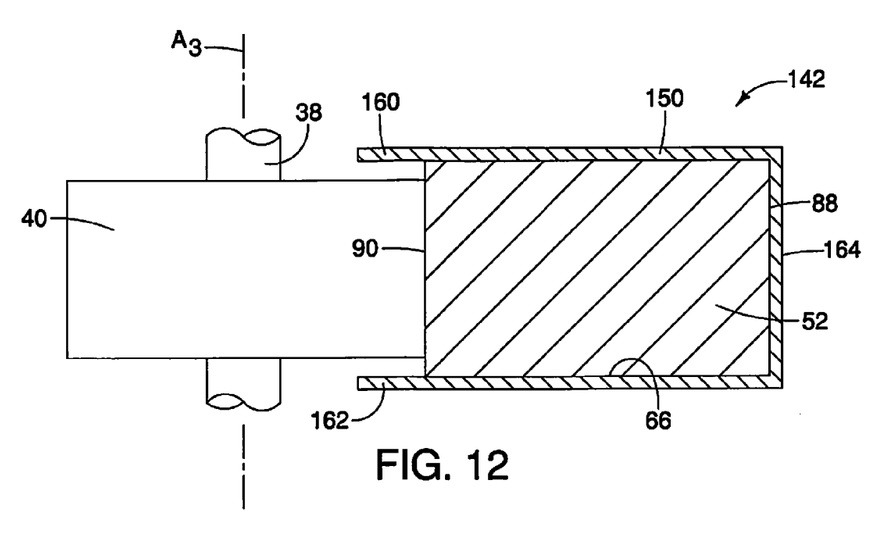
FIG. 12 is a side view of the cam arm showing contact with a cam follower in accordance with the second embodiment.

Referring now to FIGS. 10-12, a cam arm 142 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the cam arm 142 includes a support shell 150 and the cam block 52 (of the first embodiment). The support shell 150 includes all of the features of the support shell 50 of the first embodiment, except that the dimensions of the support shell 150 are greater than the overall dimensions of the support shell 50 of the first embodiment. In other words, in the second embodiment, the support shell 150 is larger than the support shell 50 of the first embodiment.

The cam block 52 in the second embodiment is identical to the cam block 52 of the first embodiment. Specifically, the cam block 52 includes the cam surface 90 with the plurality of positioning recesses 92, 94 and 96, and the plurality of movement restricting lobes 100, 102, 104 and 106. However, the support shell 150 being larger in the second embodiment is such that all of the cam block 52 is located within the block receiving space 66 of the support shell 150. Further, the cam surface 90 of the cam block 52 is located within the block receiving space 66 of the support shell 150 between the first side plate 160 and the second side plate 162 of the support shell 150. Specifically, the plurality of positioning recesses 92, 94 and 96, and the plurality of movement restricting lobes 100, 102, 104 and 106 are recessed between the first side plate 160 and the second side plate 162 of the support shell 150. Therefore, the cam follower 40 extends into the block receiving space 66 in order to contact the cam surface 90 of the cam block 52.

In other words, the base plate 164 of the support shell 150 covers all of the base surface 88 of the cam block 52. Further, the base plate 164 of the support shell 150 has an overall length $L_3$ and the base surface 88 of the cam block 52 has the second overall length $L_2$, as shown in FIG. 10. The second overall length $L_2$ of the cam block 52 is smaller than the overall length $L_3$ of the support shell 150.

The vehicle components and door hinge structures (other than the disclosed cam arms 42 and 142 described above) are conventional components that are well known in the art. Since these structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the cam link structure. Accordingly, these terms, as utilized to describe the present invention should be interpreted relative to a vehicle equipped with the cam link structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A check link structure comprising:
   a first bracket having a pivot support structure defining a first pivot axis;
   a cam arm coupled to the first bracket for pivotal movement about the first pivot axis, the cam arm comprising:
      a cam block made of a self-lubricating material, the cam block having a cam surface that includes a plurality of positioning recesses and a plurality of movement restricting lobes between adjacent ones of the plurality of positioning recesses; and
      a support shell defining a block receiving space that non-movably retains the cam block, the support shell including an upper plate, a lower plate, and a rear plate extending between the upper plate and the lower plate with the block receiving space defined between the upper plate and the lower plate, the upper plate covering the majority of an upper surface of the cam block, the lower plate covering the majority of a lower surface of the cam block, the rear plate covering substantially all of a rear surface of the cam block, and the cam surface extending past respective distal ends of the upper plate and the lower plate; and
   a cam follower having a follower surface that is configured to continuously contact the cam surface of the cam block in response to movement of one of the first bracket and the cam follower relative to the other of the first bracket and the cam follower.

2. The check link structure according to claim 1, wherein the plurality of positioning recesses and the plurality of movement restricting lobes of the cam block are completely exposed outside of the block receiving space of the support shell.

3. The check link structure according to claim 1, wherein the plurality of positioning recesses and the plurality of movement restricting lobes of the cam block are defined within the block receiving space of the support shell.

4. The check link structure according to claim 1, wherein the support shell includes a stamped metallic plate having opposing sides with the block receiving space being defined between the opposing sides.

5. The check link structure according to claim 1, further comprising
a second bracket coupled to the first bracket for pivoting movement about a second pivot axis that extends through a portion of the first bracket, the cam follower being supported to the second bracket.

6. The check link structure according to claim 5, wherein the second pivot axis is parallel to and spaced apart from the first pivot axis.

7. The check link structure according to claim 1, wherein the cam block is retained to the support shell by a plurality of mechanical fasteners.

8. The check link structure according to claim 1, further comprising
a biasing member contacting the support shell, the biasing member biasing the cam arm toward the cam follower.

9. The check link structure according to claim 1, further comprising:
a second bracket coupled to the first bracket for pivotal movement about the first pivot axis, with the cam arm being supported to the second bracket for pivotal movement about a second pivot axis spaced apart from the first pivot axis, the second axis being located adjacent a first end of the rear plate of the support shell of the cam arm.

10. The check link structure according to claim 9, wherein the plurality of positioning recesses include a first recess, a second recess and a third recess, and the plurality of movement restricting lobes includes a first lobe and a second lobe, with the first recess being adjacent to the second pivot axis and spaced apart from the second pivot axis by a first distance, with the second recess and the third recess, the first lobe and the second lobe all being spaced apart from the second pivot axis by distances greater than the first distance.

11. The check link structure according to claim 9, wherein the plurality of positioning recesses include a first recess, a second recess and a third recess, and the plurality of movement restricting lobes includes a first lobe and a second lobe, with the first recess being spaced apart from the second pivot axis by a first distance, the first lobe being spaced apart from the second pivot axis by a second distance greater than the first distance, the second recess being spaced apart from the second pivot axis by a third distance greater than the second distance, the second lobe being spaced apart from the second pivot axis by a fourth distance greater than the third distance, and the third recess being spaced apart from the second pivot axis by a fifth distance greater than the fourth distance.

12. The check link structure according to claim 9, wherein the cam follower is supported to a third pivot axis at a fixed location on the first bracket spaced apart from the first pivot axis.

13. A check link structure comprising:
a first bracket having a pivot support structure defining a first pivot axis;
a cam arm coupled to the first bracket for pivotal movement about the first pivot axis, the cam arm comprising:
a cam block having a cam surface that includes a plurality of positioning recesses and a plurality of movement restricting lobes between adjacent ones of the plurality of positioning recesses; and
a support shell defining a block receiving space that non-movably retains the cam block, the support shell including a plurality of retention tabs extending from a rear plate of the support shell; and
a cam follower having a follower surface that is configured to continuously contact the cam surface of the cam block in response to movement of one of the first bracket and the cam follower relative to the other of the first bracket and the cam follower;
a biasing member contacting the support shell, the biasing member biasing the cam arm toward the cam follower, such that one end of the biasing member is retained to the support shell by the retention tabs.

14. The check link structure according to claim 13, wherein
the upper plate covers all of an upper surface of the cam block, the lower plate covers all of a lower surface of the cam block, the rear plate covers all of a rear surface of the cam block, and the cam surface is recessed between respective distal ends of the upper plate and the lower plate.

15. A vehicle closure panel structure comprising:
a body structure defining a closure panel opening;
a closure panel;
a hinge structure pivotally coupling the closure panel to the body structure for pivotal movement of the closure panel between a closed position in which the closure panel opening is concealed by the closure panel, and an open position in which the closure panel opening is exposed, the hinge structure comprising:
a first hinge bracket fixed to the body structure;
a second hinge bracket fixed to the closure panel and coupled to the first hinge bracket for pivotal movement about a first pivot axis that extends through portions of both the first and second hinge brackets;
a check link structure that includes a cam arm pivotally coupled to the second hinge bracket for pivotal movement about a second pivot axis that extends through the second hinge bracket, the cam arm comprising:
a cam block having a cam surface with a plurality of positioning recesses and a plurality of movement restricting lobes; and
a support shell defining a block receiving space with the cam block being retained within the block receiving space;
a cam follower fixed to the first hinge bracket, the cam follower having a follower surface that is configured to continuously contact the cam surface of the cam block in response to movement of the closure panel with respect to the body structure; and
a biasing member contacting the support shell and biasing the cam arm toward the cam follower, the support shell including a plurality of retention tabs extending from a rear surface of the shell, with a first end of the biasing member being retained to the support shell via the retention tabs.

16. The vehicle closure panel structure according to claim 15, wherein
the support shell includes a stamped metallic plate having opposing sides with the block receiving space being defined between the opposing sides, and
the support shell is fixed to the cam block with mechanical fasteners.

17. The vehicle closure panel structure according to claim 15, wherein
the cam block is formed of a self-lubricating material.

18. The vehicle closure panel structure according to claim 15, wherein
the support shell includes an upper plate, a lower plate, and a rear plate extending between the upper plate and the lower plate with the block receiving space being defined between the upper plate and the lower plate, and
the upper plate covers the majority of an upper surface of the cam block, the lower plate covers the majority of a lower surface of the cam block, the rear plate covers substantially all of a rear surface of the cam block, and the cam surface extends past respective distal ends of the upper plate and the lower plate.

19. The vehicle closure panel structure according to claim 15, wherein
the support shell includes an upper plate, a lower plate, and a rear plate extending between the upper plate and the lower plate with the block receiving space being defined between the upper plate and the lower plate, and
the upper plate covers the all of an upper surface of the cam block, the lower plate covers the all of a lower surface of the cam block, the rear plate covers all of a rear surface of the cam block, and the cam surface is recessed between respective distal ends of the upper plate and the lower plate.

* * * * *